Aug. 25, 1964     L. S. RELLER ETAL     3,145,887
DRIPLESS RIM FOR A CONTAINER
Filed Oct. 10, 1961

INVENTORS
LUCILLE S. RELLER
CECIL C. KNOTEK
BY Talbert Dick & Earley
ATTORNEYS

WITNESS
NORMAN G. TRAVISS

# United States Patent Office 3,145,887
Patented Aug. 25, 1964

3,145,887
DRIPLESS RIM FOR A CONTAINER
Lucille S. Reller, R.F.D. 4, and Cecil C. Knotek, R.F.D. 3,
both of Washington, Iowa
Filed Oct. 10, 1961, Ser. No. 144,247
1 Claim. (Cl. 222—571)

Our invention relates to improvements in a dripless rim or spout for liquid containers.

In pouring a liquid from a container having a spout or rim or like, it is common and usual for a portion of the liquid to drip down the outer side of the spout or rim when the container is righted. This surplus liquid drops or runs down the container onto the surface upon which the container is placed. The amount of liquid thus lost may vary at times depending upon the shape of the particular spout or the type of liquid involved, but the action described is practically always present. It will thus be appreciated that while in the varied uses of liquid containers such as pitchers, cups, bottles or the like in households, the loss of the liquid is frequently of no moment, but the accompanying inconvenience, aggravation, and unsanitary conditions are matters to be avoided. Also, there may be occasions when the liquid involved should either be conserved or not permitted to touch unintended surfaces.

Some effort has been made to solve the problem by providing a return hole through the container. However, such structure is difficult to manufacture, is unsanitary and hard to keep clean.

Therefore, one of the principal objects of our invention is to provide a spout or rim for a liquid container from which no liquid will drip when the pouring action is terminated.

A further object of our invention is to provide a spout of the above class wherein any liquid remaining on the end thereof when pouring ceases is automatically returned to the interior of the container when the same is righted.

Still further objects of our invention are to provide a dripless container that is economical in manufacture, durable in use, sanitary, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claim, and illustrated in the accompanying drawings, in which:

Figure 1:
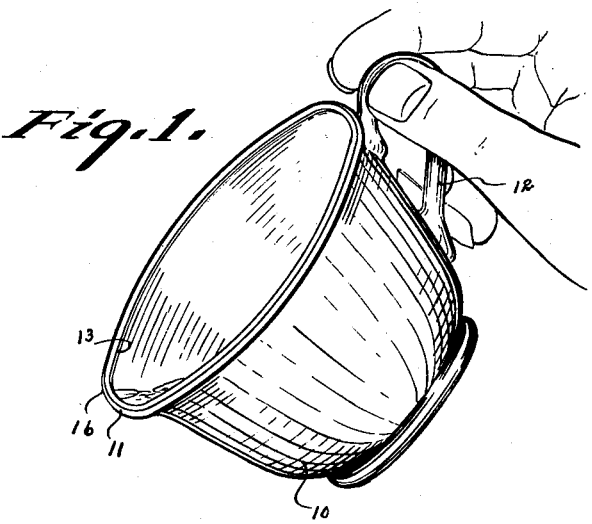
FIG. 1 is a perspective view of a container having our rim improvement.
Figure 2:
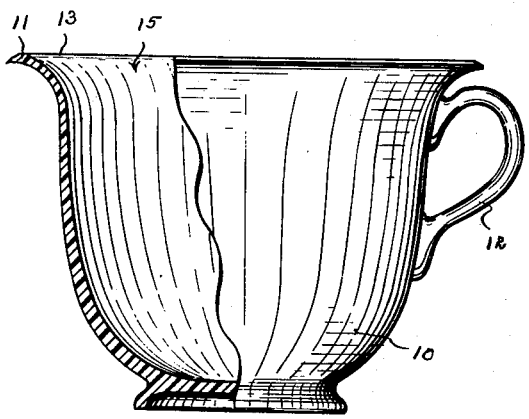
FIG. 2 is a side view of a container having our rim-structure with a section cut away to more fully illustrate its construction.

Our rim structure is applicable to various types of containers such as pitchers, cups, bottles, pouring spouts, dishes, pans, pots, and like.

In the drawings we show for purposes of illustration an open cup type container 10 having an upwardly and outwardly curved pouring rim portion 11. It is this curved rim portion 11 that serves as the pouring rim or spout portion. The numberal 12 designates a handle on the side of the container 10.

As herebefore indicated, our invention is in the specific structure of the lip or pouring spout portion 11 of the container. We take advantage of the fact that most liquids such as water, cream, milk, syrup, oil and like possess adhering or clinging molecular structure, i.e., one drop of liquid does not tend to separate from another drop of liquid. In fact, the two drops tend to join and consolidate in a unit mass.

Figure 3:
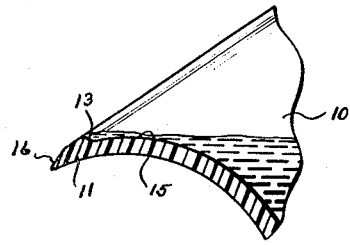
FIG. 3 is an enlarged longitudinal sectional view of our rim structure on a container.

Therefore, back a distance from the edge of the pouring spout or rim 11, we provide a shoulder ledge dam 13. When the container is in upright position the back of this shoulder extends downwardly and rearwardly to join with the curved inner side of the container, as shown in FIG. 3. When the container is tilted into pouring position, this inner surface 15 back of the ledge shoulder 13 will extend first upwardly and inwardly and then downwardly and inwardly in a curved path. When the container is upright the top of the shoulder ledge 13 will be substantially horizontally flat. Forward of this flat shoulder ledge portion is a sharpened edge portion 16, which has its top surface extending outwardly and downwardly. Thus, the dam 13 has its top area blending into the rim area and its outer edge. The ledge shoulder is, as shown, a step-up one and provides a dam with its wall facing the interior of the container. When the container is upright this wall extends downwardly and inwardly. When the container is tilted to pour a liquid therefrom, some liquid will be trapped and retained back of the step-up wall of the dam. After the pouring phase is completed and the container returned to an upright position, this trapped liquid by gravity will start to flow back into the container. It, however, is connected to the remaining liquid on the top surface of the dam which is in turn connected to all liquid (even a forming drop) on the edge of the rim portion, and as the connected trapped liquid flows back into the container it will pull with it all the liquid on top of the dam and liquid at the extreme edge of the rim 11. Thus, with all liquid moved back into the container, there will be no objectionable formed drop on the edge of the pouring rim or spout to drip. This return flow of liquid is aided by having the wall of the dam sloping downwardly and inwardly, as shown in FIG. 3. The reason most pitchers herebefore dripped was that the spout portion was curved to extend upwardly and outwardly and then downwardly and outwardly in a curved path, and therefore no liquid was trapped and only a film of liquid remained on the spout area. Some of this film liquid would of course run forwardly and collect as a drippable drop on the edge of the spout or pouring rim edge.

Some changes may be made in the construction and arrangement of our dripless rim for a container without departing from the real spirit and purpose of our invention, and its our intention to cover by our claim, any modified forms of structure or use of mechanical equivalents which may be reasonably included within their scope.

We claim:

In a dripless liquid pouring container having a bottom and a wall member extending upwardly therefrom,
  said wall member having an inside surface and an outside surface, the upper end of said wall member extending upwardly and outwardly with respect to said bottom, said outside surface of said wall member terminating at its upper end in an inclined rim portion extending inwardly and upwardly therefrom and terminating at its inner end in a substantially horizontal rim portion extending inwardly therefrom; said horizontal rim portion terminating at its inner end in a shoulder ledge dam portion which extends downwardly and inwardly therefrom;

said shoulder ledge dam portion having its lower end terminating at the upper end of said inside surface of said wall member.

References Cited in the file of this patent

UNITED STATES PATENTS

| | | |
|---|---|---|
| 2,059,910 | Ravenscroft | Nov. 3, 1936 |
| 2,442,047 | Kemper | May 25, 1948 |

FOREIGN PATENTS

| | | |
|---|---|---|
| 245,336 | Switzerland | July 16, 1947 |